United States Patent [19]
Mercer et al.

[11] Patent Number: 5,267,816
[45] Date of Patent: Dec. 7, 1993

[54] GEOGRIDS

[75] Inventors: Frank B. Mercer, Blackburn; Keith F. Martin, Wiswell; Thomas K. Gardner, Blackburn, all of England

[73] Assignee: Netlon Limited, Blackburn, England

[21] Appl. No.: 985,444

[22] Filed: Dec. 3, 1992

Related U.S. Application Data

[63] Continuation of Ser. No. 798,845, Nov. 25, 1991, abandoned, which is a continuation of Ser. No. 582,052, Sep. 14, 1990, abandoned.

[30] Foreign Application Priority Data

Sep. 14, 1989 [GB] United Kingdom ............... 8920843

[51] Int. Cl.⁵ ..................... E20D 17/20; B29D 7/00
[52] U.S. Cl. ................................ 405/258; 264/291; 405/284; 428/231
[58] Field of Search ................ 405/15, 16, 19, 258, 405/284; 264/288.4, 291, DIG. 3; 428/224, 225, 226, 229, 231

[56] References Cited

U.S. PATENT DOCUMENTS

| | | |
|---|---|---|
| 3,252,181 | 5/1966 | Hureau . |
| 3,441,638 | 4/1969 | Patchell et al. . |
| 3,554,853 | 1/1971 | Mercer et al. . |
| 3,666,609 | 5/1972 | Kalwaites et al. . |
| 3,851,034 | 11/1974 | Harmon et al. . |
| 3,914,365 | 10/1975 | Kim et al. . |
| 3,922,329 | 11/1975 | Kim et al. . |
| 4,101,358 | 7/1978 | Kim et al. . |
| 4,135,021 | 1/1979 | Patchell et al. . |
| 4,186,781 | 2/1980 | Kim et al. . |
| 4,374,798 | 2/1983 | Mercer . |
| 4,470,942 | 9/1984 | Beretta . |
| 4,530,622 | 7/1985 | Mercer .................... 405/258 |
| 4,804,293 | 2/1989 | Varkonyl et al. ............. 405/15 |
| 4,808,358 | 2/1989 | Beretta . |
| 4,992,003 | 2/1991 | Perach .................... 405/258 |

FOREIGN PATENT DOCUMENTS

| | | |
|---|---|---|
| 0108513 | 5/1984 | European Pat. Off. . |
| 0374365 | 6/1990 | European Pat. Off. . |
| 368393 | 11/1906 | France . |
| 2131842 | 11/1972 | France . |
| 2138198 | 1/1973 | France . |
| 2213843 | 8/1974 | France . |
| 969655 | 9/1964 | United Kingdom . |
| 1054946 | 1/1967 | United Kingdom . |
| 1075487 | 7/1967 | United Kingdom . |
| 1209523 | 10/1970 | United Kingdom . |
| 1340587 | 12/1973 | United Kingdom . |
| 1406642 | 9/1975 | United Kingdom . |
| 1427281 | 3/1976 | United Kingdom . |
| 1496786 | 1/1978 | United Kingdom . |
| 1548865 | 7/1979 | United Kingdom . |
| 2035191 | 6/1980 | United Kingdom . |
| 2073090 | 10/1981 | United Kingdom . |
| 2108896 | 5/1983 | United Kingdom . |
| 2124965 | 2/1984 | United Kingdom . |
| 2128132 | 4/1984 | United Kingdom . |
| 2174332 | 11/1986 | United Kingdom . |
| 1310474 | 3/2173 | United Kingdom . |

OTHER PUBLICATIONS

Book entitled "Conweb Unoriented Plastic Netting".
Brochure entitled "'Tensar' Geogrids In Civil Engineering".
Brochure entitled "Tensar—Guidelines for the design and construction of embankments over stable foundations using 'Tensar' geogrids".

Primary Examiner—David H. Corbin
Attorney, Agent, or Firm—Jacobson, Price, Holman & Stern

[57] ABSTRACT

A starting material is stretched longitudinally to produce a geogrid. The starting material has pronounced ribs on each face, merging into sloping sides. Between the ribs, there are holes on a square grid. The mean thickness of the longitudinal elements is substantially greater than the mean thickness of the interconnecting elements, and the cross-sectional area of the longitudinal elements is at least 2.5 times the transverse cross-sectional area of the interconnecting elements. The longitudinal elements are stretched out into continuous oriented strands. The centers of the junctions reduce in thickness by at least 10% but substantially less than the percentage reduction at the thinnest part of the strand.

28 Claims, 12 Drawing Sheets

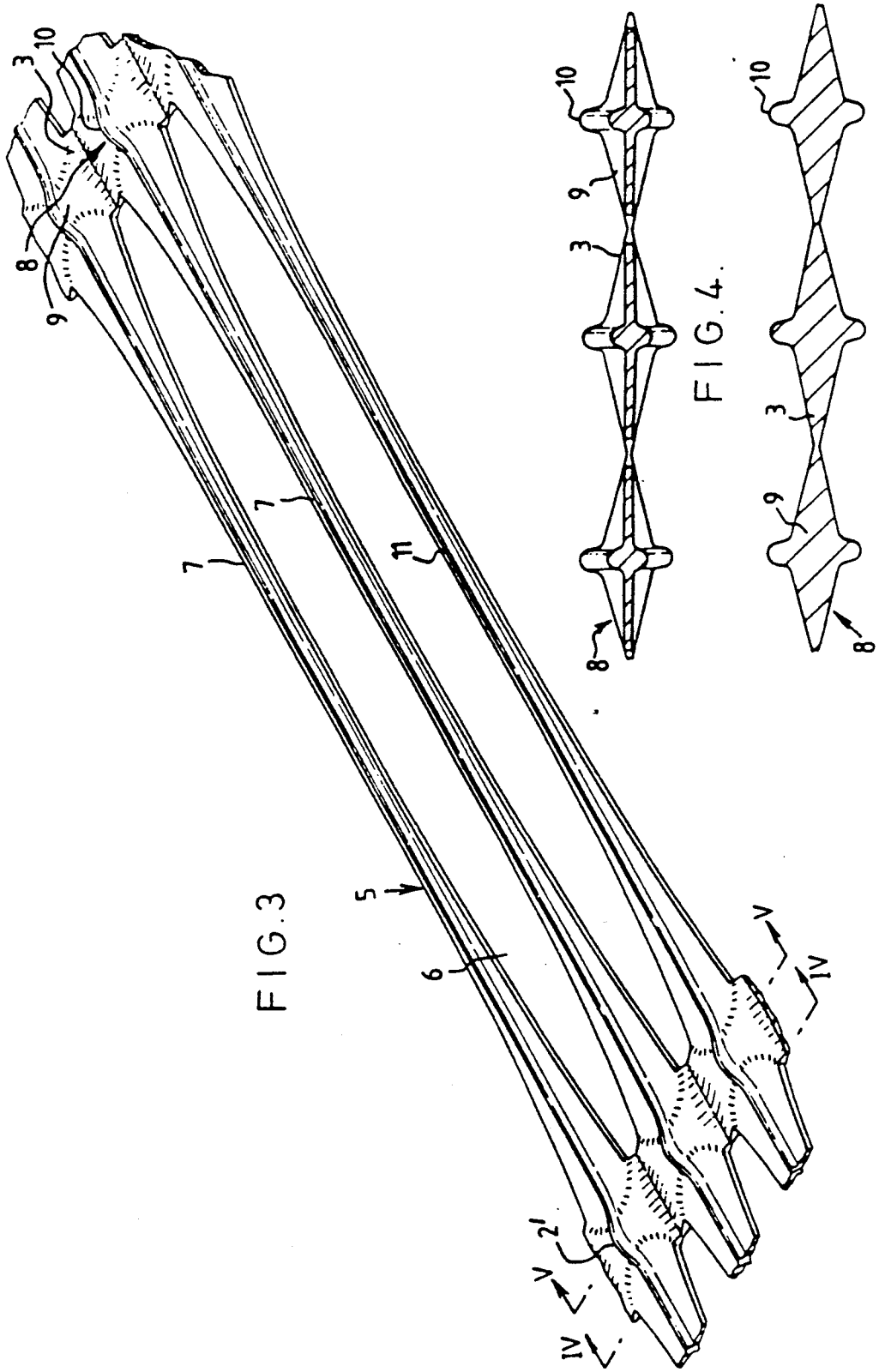

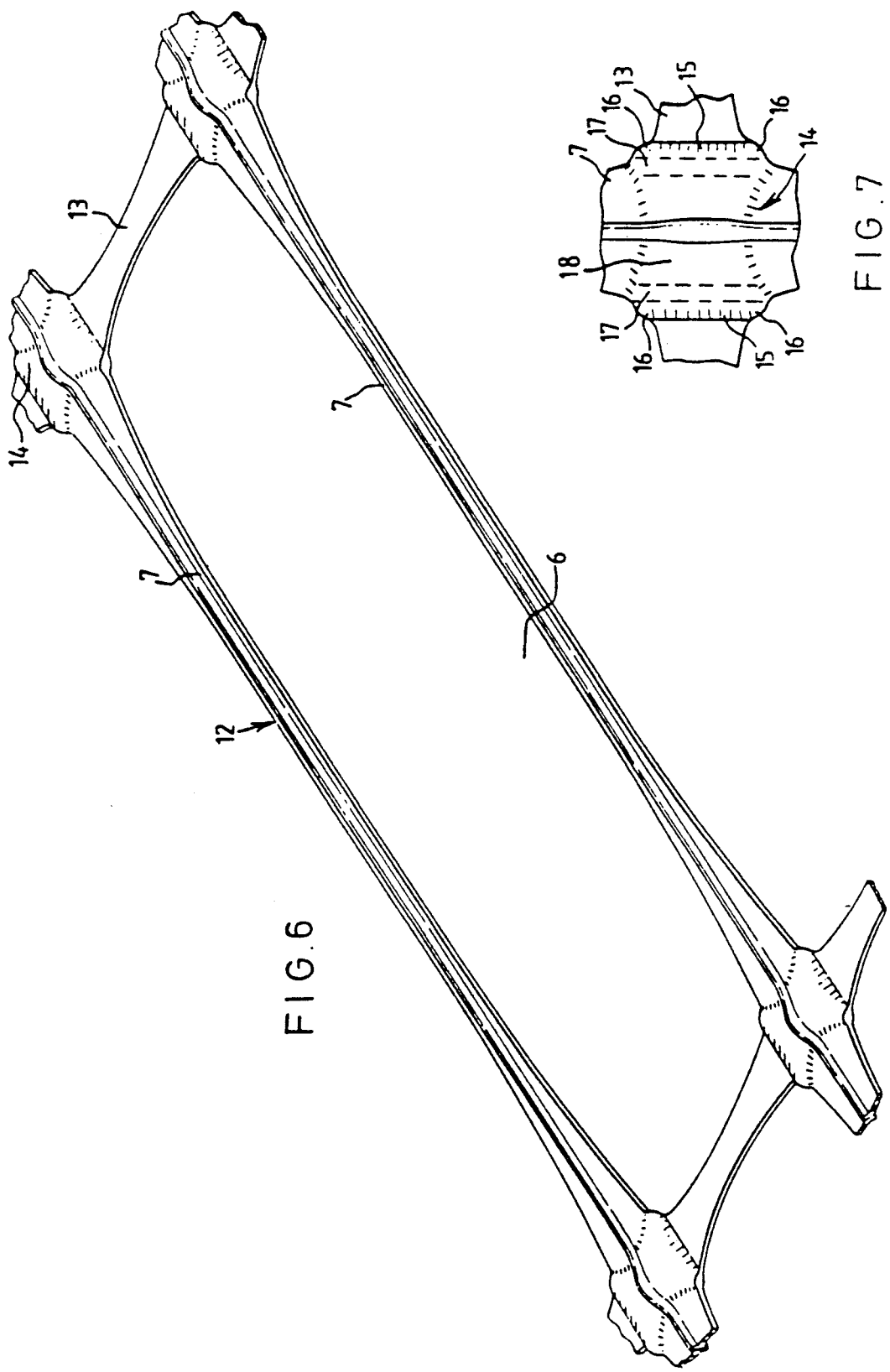

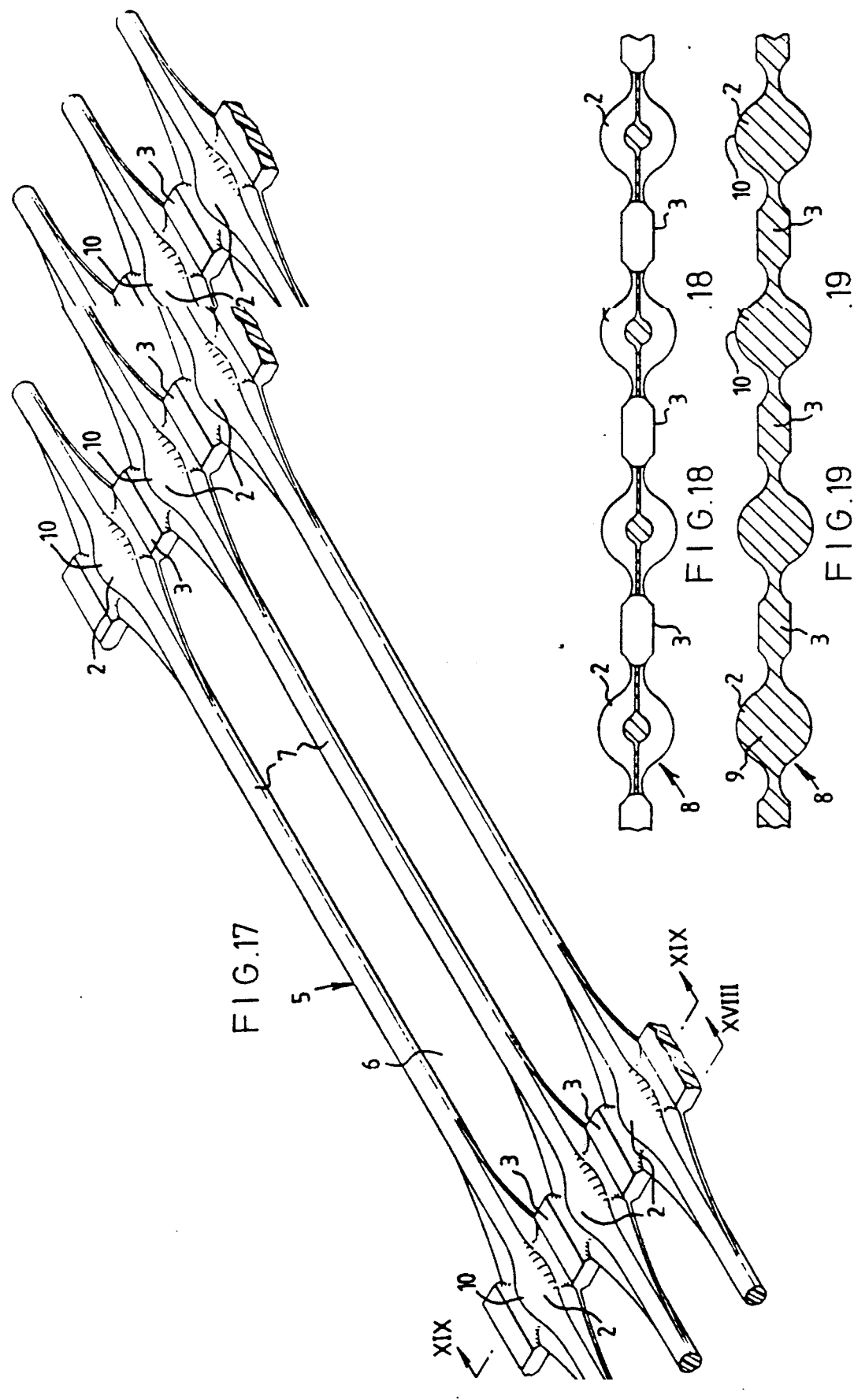

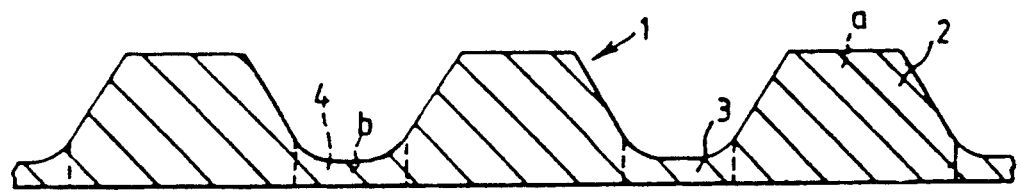
FIG. 29
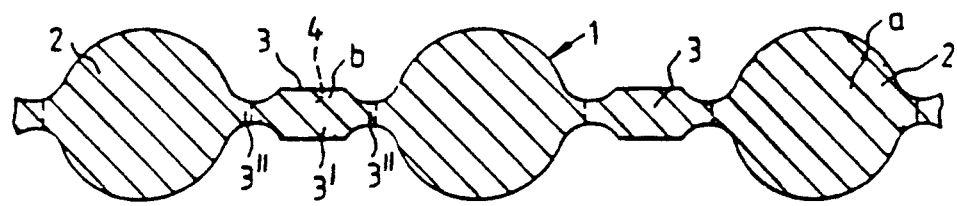
FIG. 30
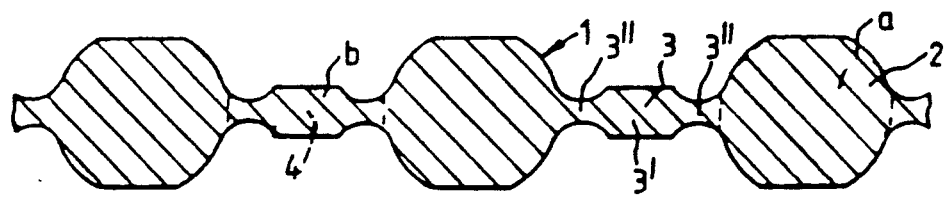
FIG. 31
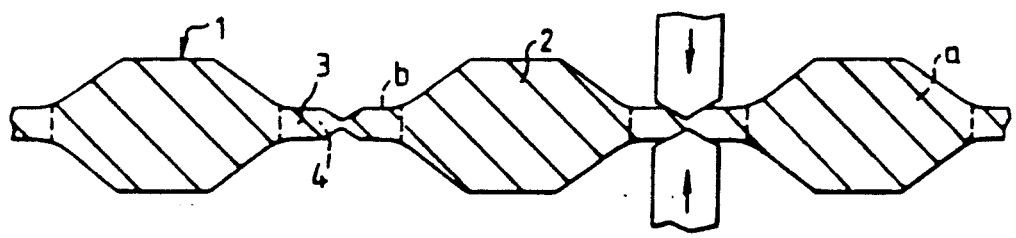
FIG. 32
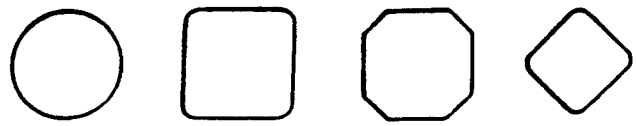
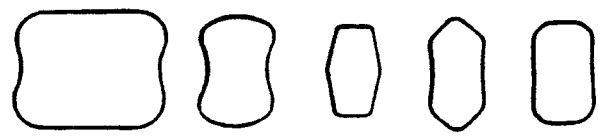
FIG. 33

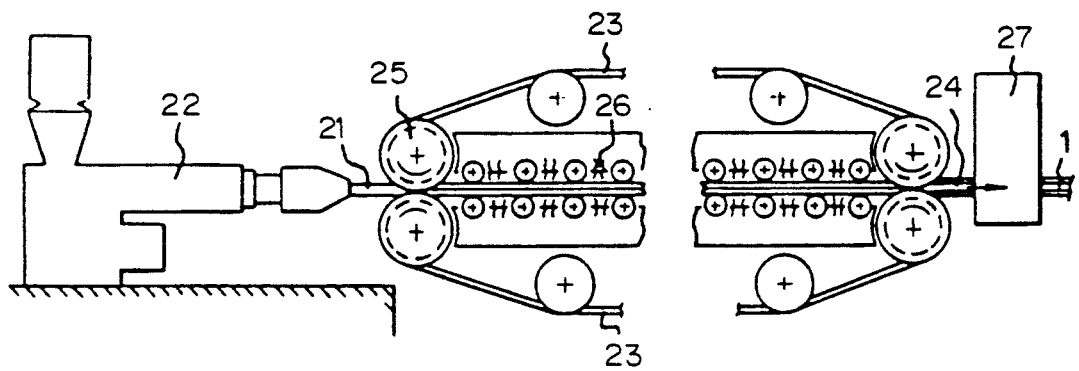
F I G. 34
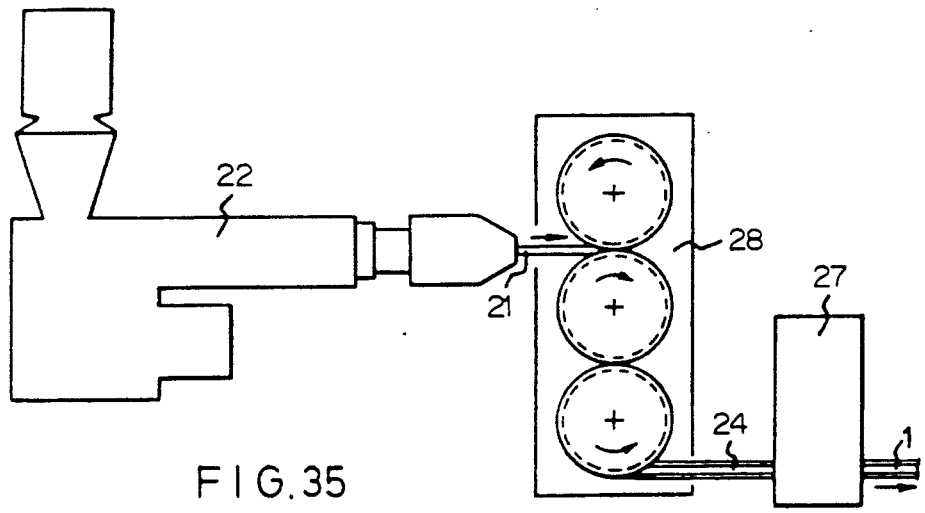
F I G. 35
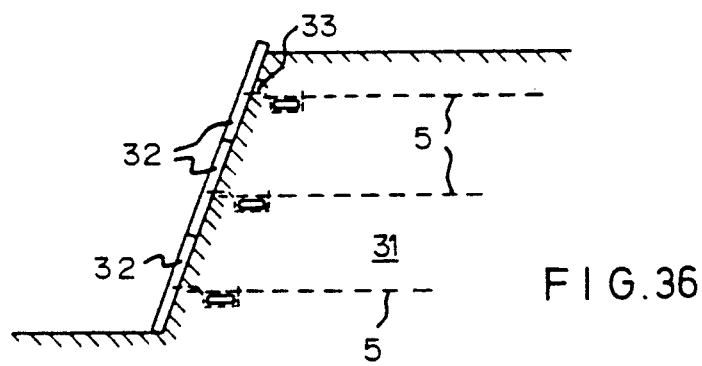
F I G. 36

GEOGRIDS

This application is a continuation of application Ser. No. 07/798,845 filed Nov. 25, 1991, now abandoned, which is, in turn, a continuation of application Ser. No. 07/582,052, filed Sep. 14, 1990, now abandoned.

BACKGROUND OF THE INVENTION

The present invention relates to geogrids, which are plastics grid structures made from stretching a starting material having a pattern of holes formed therein, the structures having mesh openings with molecularly-oriented strands on at least two opposite sides, junctions in the structures being at least partly molecularly-oriented. Geogrids are described in, for instance, U.S. Pat. No. 4 374 798 and EP A-O 374 365.

A uniax geogrid can be considered as a grid formed by parallel, spaced, oriented strands interconnected by interconnecting elements, the interconnecting elements and the respective parts of the strands, which can be loosely termed junctions, forming bars at right angles to the strands. The starting material can be considered as formed of spaced, parallel, continuous longitudinal elements and between the longitudinal elements, interconnecting elements interconnecting the longitudinal elements. The holes are normally on a square or rectangular grid.

As the market acceptance of the uniax geogrid has increased, so has the demand for geogrids of greater strength, and for geogrids having improved economy ratings. HDPE is the preferred raw material for long term applications for uniax geogrids and the Governments of Britain (Agreement Certificate) and the Federal Republic of Germany (Bautechnik Certificate) have issued certificates for such geogrids, which acknowledge that in numerous construction applications they will have a useful life of 120 years. Typical dimensions for uniax geogrids, measured between centres of transverse bars, are 114 mm to 160 mm. Such geogrids exhibit an economy rating in the range of 100 to 120 kN perm m per kg of resin per square metre, and the overall stretch ratio during production is usually in the range of 4.5:1 to 5.0:1. It is possible to increase the economy rating by lengthening the aperture which forms the zones to be stretched, but this results in greater spacing of the transverse bars; a spacing of say 250 mm is considered to be the upper limit in usages such as embankments and soil retaining walls. Greater strength can be achieved by increasing the starting material thickness, e.g. up to 6 mm thickness. 6 mm thick starting sheets of high density polyethylene can produce a strength of 110 kN per metre width, but only exhibit an economy rating of 100 kN per m per kg per m².

There is a strong market demand for geogrids having high strength and a high economy rating.

Apart from the foregoing, it is desirable to be able to increase the overall stretch ratio and the amount of orientation passing through the junctions without a marked tendency for the junctions to split along the centre lines of the strands or in any part of the junctions.

DEFINITIONS

The holes in the starting material may be through-holes or blind holes, but if the holes are blind, the base will rupture on stretching.

The term "oriented" means molecularly-orientated. In general, when an orientated strand is referred to, the preferred direction of orientation is longitudinal of the strand.

"Uniax" and "biax" mean uniaxially stretched and biaxially stretched, respectively "Thick" refers to the dimension normal to the plane of the starting material or geogrid and "width" refers to the appropriate dimension in the plane of the starting material or geogrid. The thickness of the starting material or of the geogrid is the distance between the extreme faces of the starting material or geogrid, or of the part specified. The minimum thickness of a strand is the thickness of the strand cross-section midway between notional junction zones—this is substantially the same as taking the section of the strand where its thickness is a minimum, for all holes of normal shape.

The "mean thickness" of a zone is the average thickness of the zone, determined by measuring the area of the zone and dividing it by the width of the zone.

The "equivalent thickness" is the thickness of a flat starting material having the same weight per unit area, before forming the holes, it being assumed that the holes are formed by punching or other material removal technique.

The bar length is the distance between transverse tangent lines in the starting material The tangent line is a notional line tangent to respective vertical sided holes or mesh openings; if the holes or mesh openings are not vertical sided (i.e. perpendicular to the plane of the starting material or geogrid), the tangent line is the notional line tangent to the respective equivalent vertical-sided holes or mesh openings. A longitudinal tangent line extends parallel to the longitudinal elements; a transverse tangent line extends parallel to the respective interconnecting elements. In the starting material, the notional junction zone is the zone of the longitudinal element defined between pairs of longitudinal and transverse tangent lines at the junctions between longitudinal elements and interconnecting elements.

The word "uniplanar" means that the material or geogrid is substantially symmetrical about a median plane parallel to its faces. In general, a uniplanar starting material will give a uniplanar geogrid when stretched.

A "flat" starting material has planar, parallel faces.

Sections are taken at right angles to the plane of the starting material or geogrid.

The term "soil" includes rocks, stones, gravel, sand, earth or clay.

The "economy rating" is the strength of the geogrid per unit width per unit mass per unit area, measured as kN per-m per kg per m².

The "strand strength" is the strength of the part of a geogrid strand between the bars.

"HDPE" is high density polyethylene.

A diabolo-shaped hole is a hole having the general shape described in GB-A-2 174 332.

"Grooving" is the cold-forming procedure as or similar to that described in GB-A-2 128 132.

THE INVENTION

The invention applies to geogrids formed from starting materials which have a thickness of at least 6 mm at their thickest points. The mean thickness of the longitudinal elements in the starting material is substantially greater than the mean thickness of the interconnecting elements as seen in section along the centre lines of the interconnecting elements, and the area of the longitudinal elements is at least 2.5 times greater than the area of the interconnecting elements as seen in said section. When stretching, stretching is continued until the centres of the notional junction zones have reduced in thickness by at least 9.6% and stretching is terminated while the percentage reduction in thickness of the centres of the notional junction zones is substantially less than the percentage reduction in thickness of a strand entering the respective notional junction zone, as measured midway between notional junction zones. During stretching, the ends of the interconnecting elements may be oriented in the longitudinal direction.

GENERAL

A main advantage of the invention is greatly increased strength per unit weight of geogrid. For instance, a starting sheet of 6 mm equivalent thickness can be profiled in such a manner as to have 10 mm thick longitudinal elements and 2 mm thick interconnecting zones, and give an increase in strength of roughly 50%, 70%, or more compared to equivalent products of US 4 374 798. A strength of about 200 kN per meter width or more, and an economy rating of 170 or more, can be achieved with HDPE.

In general, by profiling the starting material sheet, a major proportion of the plastics material can be located in the longitudinal elements whilst leaving a minor proportion in the interconnecting elements, thereby optimising the use of plastics material to form the load-bearing strands of the geogrid and enabling much higher strength per unit weight of plastics material to be achieved. The use of the thicker longitudinal elements enables the width occupied by the holes to be less, without the whole notional junction zone extending excessively in the longitudinal direction during stretching. Although some longitudinal extension of the notional junction zone is permitted, excessive extension is not desirable and this establishes the minimum width to be occupied by the holes.

In comparison with a flat starting material, material has been transferred from the zones which are not stretched to the zones which are stretched. In addition, if the holes are formed by punching (which is the preferred method), reducing the thickness of the interconnecting zones causes less material to be punched out and recirculated. In general, the holes (as measured at their maximum width) preferably occupy not less than about 25% and/or not more than about 50% of the total width of the starting material, preferably around 37.5%.

The molecular orientation is passed through the notional junction zones so that there is substantially uniaxial orientation running through the whole length of the structure (this means that in every transverse cross-section of the notional junction zone, there is some oriented material: there may also be some unoriented material). The continuity of orientation considerably improves the long term creep resistance (i.e. long term resistance to extension under load) of the structure. The invention enables more orientation to be passed through the notional junction zone.

The orientation is caused to pass more positively through the notional junction zones because the stress during stretching is concentrated in line with the longitudinal elements; there is less stress dissipation compared to a uniax structure of U.S. Pat. No. 4 374 798, because the interconnecting elements are of smaller cross-sectional area and therefore mass. This enables a greater degree of overall orientation (i.e. a greater overall stretch ratio), e.g. of 5.5:1, 6:1 or 6.5:1 or more for HDPE for example, to be achieved.

As more orientation is being passed through the notional junction zone than with flat starting materials such as in U.S. Pat. No. 4 374 798, for a given longitudinal hole length longitudinal pitch and stretch ratio, there is less orientation in the strands since more plastics material is being drawn out of the notional junction zones. In other words, the degree of orientation passing through the notional junction zone is being controlled. Additional control can be obtained from the width of the hole in any given starting material. In numerical terms, the stretch ratio applied to the mid-point of the notional junction zone, as measured on the surface of the notional junction zone, can be as great as 2.5:1, 3:1 or 3.3:1, with overall stretch ratios of for instance 6:1.

The interconnecting elements constrain the longitudinal elements to orientate less in the notional junction zones than in the strands. In order to achieve this, the interconnecting elements must have sufficient thickness or transverse or longitudinal cross-section or length to influence the orientation of the longitudinal elements, but the interconnecting elements must not have so great a thickness or cross-section as to reduce the directional effect of the longitudinal elements to too great an extent.

Preferably, the ratio of the mean thickness of the longitudinal elements to the mean thickness of the interconnecting elements, is not less than about 1.5:1 or 1.67:1 and more preferably not less than about 1.8:1, or 2:1 or 2.15:1, thereby reducing the constraining effect of the interconnecting elements.

Another measure of the constraining effect of the interconnecting elements is to consider the ratio of the length of the notional junction zone to its mean thickness along the notional longitudinal tangent line. If the notional junction zone is too short, the effect of the interconnecting elements is too little and the notional junction zone may thin down excessively.

A further measure of the constraining effect of the interconnecting elements is to consider a section through the longitudinal element on the centre line of the interconnecting elements, and to consider the ratio of the area of such a section to the area of a section along the longitudinal tangent line. Preferably this ratio (termed the longitudinal/transverse area ratio) is not less than about 1.67:1 or 1.33:1. However, the ratio is preferably not greater than about 6.67:1 or 5:1.

Yet another measure of the constraining effect of the interconnecting elements is to consider the ratio of the width of the longitudinal element to its thickness, as seen in section along the axis of the centre line of the interconnecting elements. The ratio is preferably no greater than about 2:1 or 1.75 or 1.72:1 or 1.65:1.

It is preferred that during stretching the interconnecting elements do not extend in the longitudinal direction.

For economy, one can consider a section along the centre line of respective interconnecting elements; the ratio of the area of the longitudinal element to the area of the interconnecting element shall be not less than about 2.5:1, and may be not less than about 3.3:1 or 5:1.

The longitudinal element can be of substantially uniform section throughout the starting material (except at locations where clearly defined yield points are formed by grooving, if this is done), but this is not necessarily so. In general terms, the starting material can be formed such that the parts of the longitudinal element which extend across the respective notional junction zones, and preferably for a distance on either side of the notional junction zone, are thicker than the intervening parts and preferably of substantially uniform section, said distance preferably being at least 10% or 20% of the length of the notional junction zone.

The orientation behaviour is believed to be affected by the shaping of the longitudinal element in the notional junction zone (as seen in transverse cross-section).

In general, at least that part of the longitudinal element which is in the notional junction zone (and preferably at least for said distance on either side thereof) may have at least one longitudinally-extending portion which is substantially thicker than at least one lateral edge (and preferably both lateral edges) of that part of the longitudinal element. There may be more than one said longitudinally-extending portion, but there is preferably one, on the centre line of the longitudinal element. The or each portion is preferably spaced from both lateral edges of the longitudinal element. The ratio of the thickness of said longitudinally-extending portion to the thickness of the lateral edges of the longitudinal element is preferably at least about 1.5:1 or 1.8:1 or 2:1 and is preferably not greater than about 3:1 or 5:1 or 7:1. Increasing the thickness of said longitudinally-extending portion appears to permit increase of the stretch ratio whilst maintaining a volume of less orientation in the centre of the notional junction zone, although a significant stretch ratio may be applied to the surfaces of the notional junction zone.

The orientation behaviour may be improved if the innermost area of the notional junction zone, as seen in section, has a lessened influence on, or a lower interference with, the surface areas, allowing the surface areas to stretch further. This can be achieved if said longitudinally-extending portion comprises a longitudinally-extending protuberance or more specifically a projecting rib, on at least one face of the starting material. One possible shape (as seen in transverse section) comprises a protuberance whose sides are more steeply inclined than the surfaces on either side; if radiussing is applied, the sides of the protuberance can be defined in part by concave curves and the top of the protuberance can be defined by a convex curve.

As seen in section along the centre lines of the interconnecting elements, the material between said longitudinally-extending portions can be of uniform thickness, except where grooved, if so grooved. However, the sides of the longitudinal elements, i.e. on either side of the thickest point of the longitudinal element or of said protuberance, preferably slope, e.g. at 15° to about 40° or 45° to the plane of the material, and may slope right down to the thinnest part of the starting material (though preferably with radiussing). The outer surfaces (i.e. the tops and bottoms) of the longitudinal elements may be planar and parallel, for production reasons.

As an alternative shape to the rib, the cross-sectional shape of the longitudinal element could be approximately polygonal (e.g. a hexagon or octagon with two opposite sides parallel to the plane of the starting material) preferably approximately regular polygonal or approximately an ellipse or circle. To avoid cracking, any externally concave shape is preferably radiussed.

Preferably, any transverse section through a said longitudinal element has a thickness of at least 6 mm at its thickest part.

The median plane of the interconnecting elements which is parallel to the plane of the starting material is preferably coincident with or internally of the plane of the highest point of the longitudinal element on the respective face, and the interconnecting elements may be wholly within the plane of the highest point of the longitudinal element on the respective face. The longitudinal elements can project from just one side (e.g. with the other side flat), or from each side of the starting material, but preferably the starting material is substantially uniplanar.

As indicated above, stretching has to be continued until the whole length of the longitudinal elements has been oriented, i.e. until there is significant penetration of orientation through the notional junction zones, but stretching must be terminated before there is too great a degree of orientation through the notional junction zones—if there is too great a degree of orientation through the notional junction zones, splitting may occur in use. In practice, the degree of orientation can be obtained by X-ray diffraction tests. A good indication of the orientation ratio can be achieved by measuring the percentage reduction in cross-sectional area or by measuring the increase in spacing between lines marked on the starting material. With longitudinal elements of uniform thickness, the centre of a junction will be substantially thicker than the thinnest part of a strand entering the junction. In general terms, stretching must be terminated while the thickness of the junction on the centre lines of the interconnecting elements or bars is substantially greater (e.g. at least 50%, 75%, 100% greater) than the overall thickness of the thinnest point of the strands entering the junction. In each case, the thickness can be measured on the centre line of the strand. Thus although it is desirable that the whole cross-section of those parts of the strands extending between the junctions should be highly oriented, it is required that the degree of orientation should decrease across the junctions and increase thereafter.

The longitudinal profile of the junction of the preferred uniax geogrid, i.e. as seen in section along he centre line of the strands and normal to the plane of the geogrid, may be different from prior profiles; it is possible that this profile per se contributes to the improved properties of the geogrid. In the notional junction zones of the geogrid, as seen in section normal to the geogrid along the centre line of the respective strand, there is a continuous increase in thickness up to the central zone of the notional junction zone, with no dip in the notional junction zone. The centre of the junction is thinner than the centre of the notional junction zone of the starting material; the thickness is always reduced compared to the starting material, by at least about 9.6% or 12.5% or 14.8% (say 15%) or 21.2%, and may be reduced by up to about 25% or more.

Clearly defined yield points can be established in the longitudinal elements. Thus, by using say a circular punch or a diabolo-shaped punch, one or two clearly defined yield points can be established at the narrowest point or points of the starting material between adjacent holes. Clearly defined yield points enable the tensile properties of the geogrid to be more clearly defined by ensuring that the ultimate failure position is on the strand, at or near the yield point, and also ensure that the parts of the longitudinal elements between the notional junction zones orient first and thus provide greater control of tho penetration of orientation into and through the notional junction zones.

The starting material can be made in any suitable way. It is desirable to profile the starting material (but not necessarily form the holes) at a temperature above or within the melting range, or possibly within the softening range. For instance one can use melt forming in general, Duinat FR-A 368 393, Hureau U.S. Pat. No. 3 252 181, GB-A-969 655, GB-A-1 406 642, Hureau FR-A-2 138 198 or Labarre FR-A-2 131 842. However the preferred method is melt forming by passing a heated web between continuous belts at least one of which is profiled, the holes being formed simultaneously or preferably afterwards by for instance punching; alternatively, the starting material can be formed by extruding. The starting materials are preferably not oriented, but this does not exclude the presence of melt-flow orientation, which can be ignored; melt-flow orientation includes any orientation that occurs as an extruded plastics material, immediately after extrusion, is expended before reaching a mandrel and/or expanded over a mandrel.

BIAX GEOGRIDS

Market forces clearly show that in the strength range of 40 kN to 60 kN per metre width for uniax geogrids, there would be substantial practical advantages in use if geogrids could be created which were in the width range of 2.5 m to 4 m with the primary strength extending longitudinally of the geogrid. This has been impractical because of the difficulty and the extremely high costs involved in creating precisely apertured starting materials and uniaxial stretching machines having a width greater than 1.5 m.

It has been discovered that the starting materials of the invention give significant advantages when producing biax geogrids. When the uniax structure of the invention is stretched e.g. 1.5:1 to 3:1 overall in the direction at right angles to the first stretching direction, the reduced section of the interconnecting elements causes orientation to be initiated in the interconnecting elements and the orientation can be controlled in order to prevent its penetration into the notional junction zones. This means that the structure can be widened without disturbing the performance of the strands in the direction of first stretch. When producing the biax geogrids, the stretching in the two directions can be carried out simultaneously or the interconnecting elements could be stretched before stretching the longitudinal elements; however, it is preferred to stretch the interconnecting elements after the longitudinal elements, and it is also preferred to have the longitudinal elements extending in the machine direction.

PREFERRED EMBODIMENTS

The invention will be further described, by way of example, with reference to the accompanying drawings, in which:

FIG. 3 is an isometric view of the uniax geogrid formed by stretching the starting material of FIG. 1 uniaxially;

FIG. 4 is a section along the plane IV—IV in FIG. 3 (transverse tangent line section);

FIG. 5 is a section along the plane V—V in FIG. 3 (bar centre line section);

FIG. 6 is an isometric view of the biax geogrid formed by stretching the geogrid of FIG. 3 at right angles to the first stretching direction;

FIG. 7 is an enlarged plan view of a junction of the mesh structure of FIG. 6.

Figure 1:
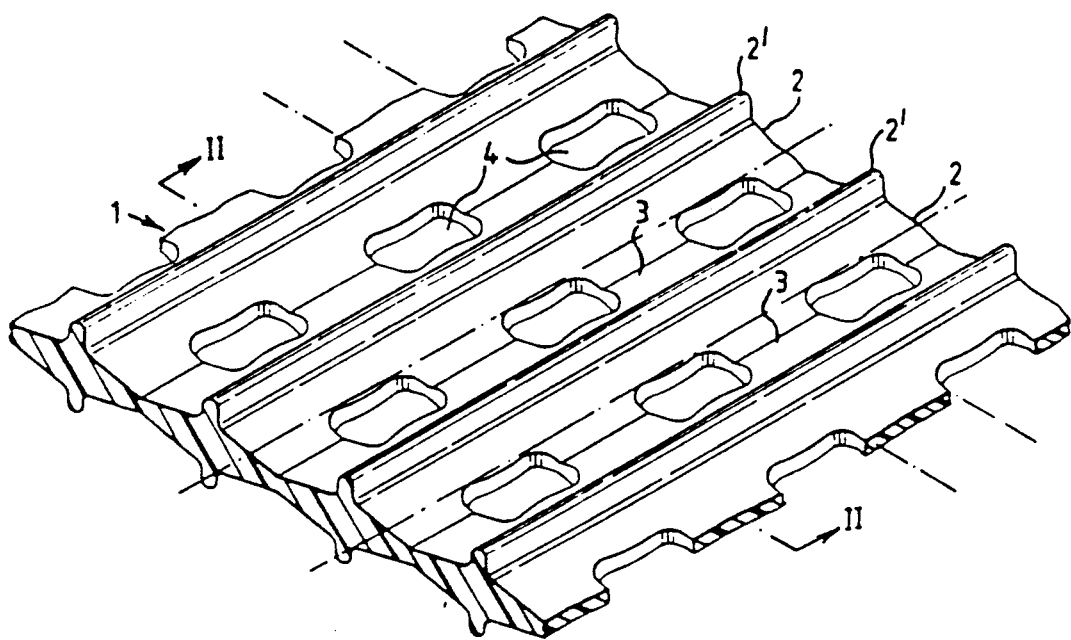
FIG. 1 is an isometric view of a starting material.
Figure 20:
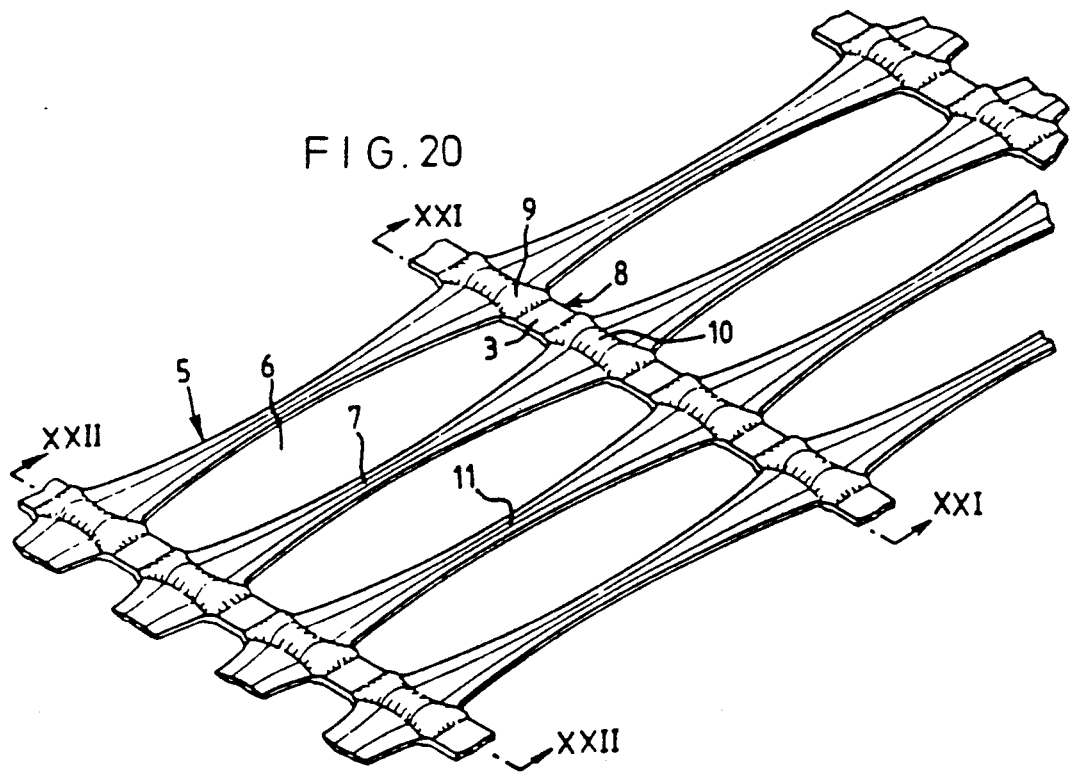
Figure 21:
Figure 22:

FIGS. 15 to 19 correspond to FIGS. 1 to 5, but show another different starting material and uniax geogrid;

FIGS. 20 to 22 correspond to FIGS. 3 to 5, but show a geogrid made from the starting material of FIG. 32, but without grooving;

FIGS. 23 to 32 are cross-sections through other starting materials, taken in a plane corresponding to the plane II—II indicated in FIG. 1;

FIG. 33 shows hole shapes that can be used;

FIGS. 34 and 35 are schematic elevations of two different plants for producing the profiled starting material for the invention; and FIG. 36 is a vertical section through an embankment, illustrating the use of a geogrid of the invention.

For general procedures regarding stretching, reference can be made to U.S. Pat. No. 4 374 798. Where appropriate, the passage in U.S. Pat. No. 4 373 798, column 10, lines 7-60 is applicable to the present invention.

All the embodiments given below are taken from the centre portion of laboratory samples; except where otherwise indicated, for the first or only stretch the degree of transverse restraint is equivalent to a transverse contraction of up to 15%, which is substantially the order of restraint expected in manufacture when the stretch is in the machine direction (as is normal).

Throughout the drawings, the same references indicate equivalent items.

FIGS. 1 TO 5

Figure 2:
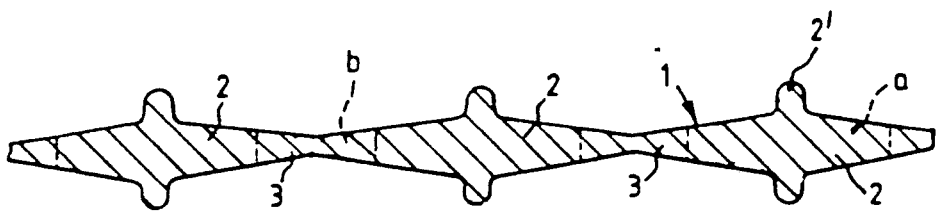
FIG. 2 is a section along the plane II—II in FIG. 1.

The starting material 1 shown in FIG. 1 is strictly uniplanar, is formed of HDPE and has spaced, parallel, uninterrupted or continuous longitudinal elements 2 and, between the elements 2, thinner interconnecting elements 3. The interconnecting elements 3 extend between through-holes 4 formed by punching the thinner material interconnecting the elements 2. The centres of the holes 4 are on a notional square grid two of whose sides are parallel to the elements 2. FIGS. 1 and 2 show that the holes 4 can be formed wholly in a part which is not parallel faced. Notional longitudinal and transverse tangent lines are indicated with dash-dot lines in FIG. 1 and define notional junction zones. As can be seen in FIG. 2, each longitudinal element has on each face a marked rib 2' which forms a thicker longitudinally-extending portion or central protuberance, spaced from both lateral edges (longitudinal tangent lines) of the longitudinal element 2. On either side, the ribs 2' are radiussed into surfaces which slope at about 10° to the median plane. The thickness of the centre of the longitudinal element 2 is about 300% more than its thickness at the longitudinal tangent line (its lateral edge). The interconnecting elements 3 are formed of portions which continue the slope of the longitudinal element 2.

The transverse section, shown in FIG. 2, is notionally divided into a first zone a through the longitudinal element 2 and a second zone b through the interconnecting element 3; in other words, the second zone b is a projection of the widest part of the hole 4. The a:b area ratios and the a:b mean thickness ratios are given in Table 1 for FIG. 2 and for other figures.

The starting material 1 was stretched longitudinally to an overall stretch ratio of 6:1 (about 11:1 on the strands), producing the uniax mesh structure or geogrid 5 of FIG. 3. The geogrid 5 has mesh openings 6 formed from the holes 4 and defined by a grid of oriented, parallel strands 7 formed from the longitudinal elements of the starting material 1 and bars 8 at right angles to the strands 7; the bars 8 are formed by the interconnecting elements 3 and the respective parts of the strands 7 Some of the plastics material that was in the starting material notional junction zone is pulled out into the parts of the strands 7 between the junctions 9; the junctions also form part of the strands 7. The overall stretch ratio is such that the whole length of the longitudinal elements 2 has been substantially uniaxially oriented. The orientation extends is also such that the thickness of the strands 7 on the centre lines of the bars, specifically at the mid-points 10 of the junctions 9, is substantially greater than the thickness of the strands 7 at 11, midway between adjacent notional junction zones or bars. In the notional junction zones of the geogrid 5, as seen in section normal to the geogrid 5 along the centre line of the respective strand 7, there is a continuous increase in thickness up to the central zone of the notional junction zone, with no dip in the notional junction zone. The effect of the lobes formed by the ribs 2' is to increase the orientation over the junction 9, at least on the surfaces of the junction 9, and it was found that there was a stretch ratio of about 3.3:1 on the surface.

FIGS. 6 AND 7

In FIG. 6, the uniax geogrid 5 of FIG. 3 has been stretched transversely 3:1 overall to form a biax geogrid 12. Although not shown, it is preferred to increase the transverse pitch of the starting material 1; increasing the transverse pitch slightly alters the a:b ratio and the mean thickness ratio, and provides a sufficient transverse dimension in the zone b to ensure that a significant strand is formed without interfering with the junction 9.

In effect, the oriented strands 7, and particularly the junctions 9, of FIG. 3 have not been interfered with and there is no substantial change at any point along the continuous lengths of the strands 7. However, the interconnecting elements 3 have been stretched out with orientation being initiated in the centres of the elements 3, to form transverse oriented strands 13, thereby increasing the area of the geogrid and reducing the weight of plastics material per unit area. One of the junctions so produced is shown in FIG. 7. The centre part 14 is oriented only in the direction of first stretch, and there are transversely oriented lateral parts 15, a small zone 16 of unoriented or less oriented material at each corner, and a small zone 17 of substantially unoriented or less oriented material running down each side, dividing the lateral part 15 from the longitudinally oriented centre part 14. In practice, the material of the zone 17 may be slightly oriented, either in the longitudinal or transverse direction, or biaxially, but the effect is as though there were no orientation.

FIGS. 8 TO 14

Figure 8:
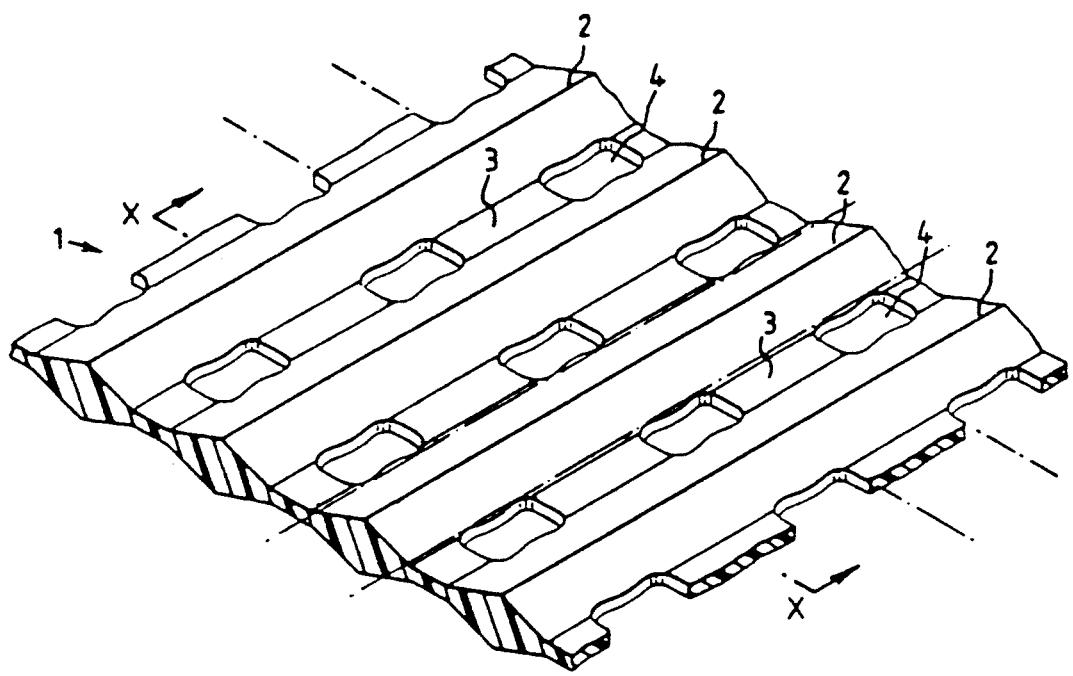
FIGS. 8 to 14 correspond to FIGS. 1 to 7, but show a different starting material and geogrids.
Figure 9:
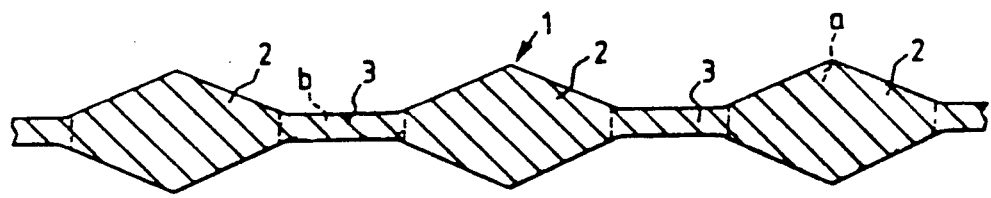

The starting material 1 shown in FIGS. 8 and 9 has relatively wide longitudinal protuberances or ribs which comprise the longitudinal elements 2. The longitudinal elements 2 have sides which are shown as sloping at about 36°, the centre being about 400% thicker than the lateral edges (at the longitudinal tangent lines). Apart from the very ends, the interconnecting elements 3 are parallel-faced. The major part of each hole 4 is formed in the parallel-faced part, but the edges of the holes 4 extend slightly into the edges of the ribs. Specific examples of this type of starting material are given in columns 1 to 5 of Table 2 below.

Figure 10:
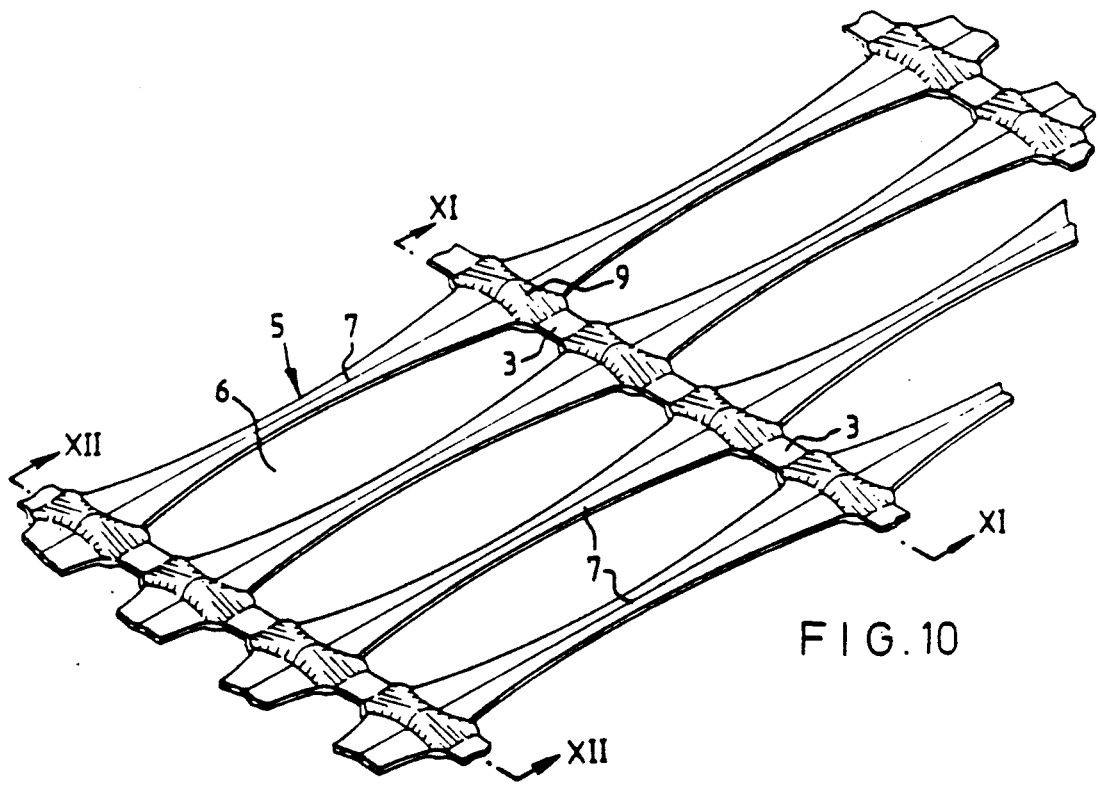
Figure 13:
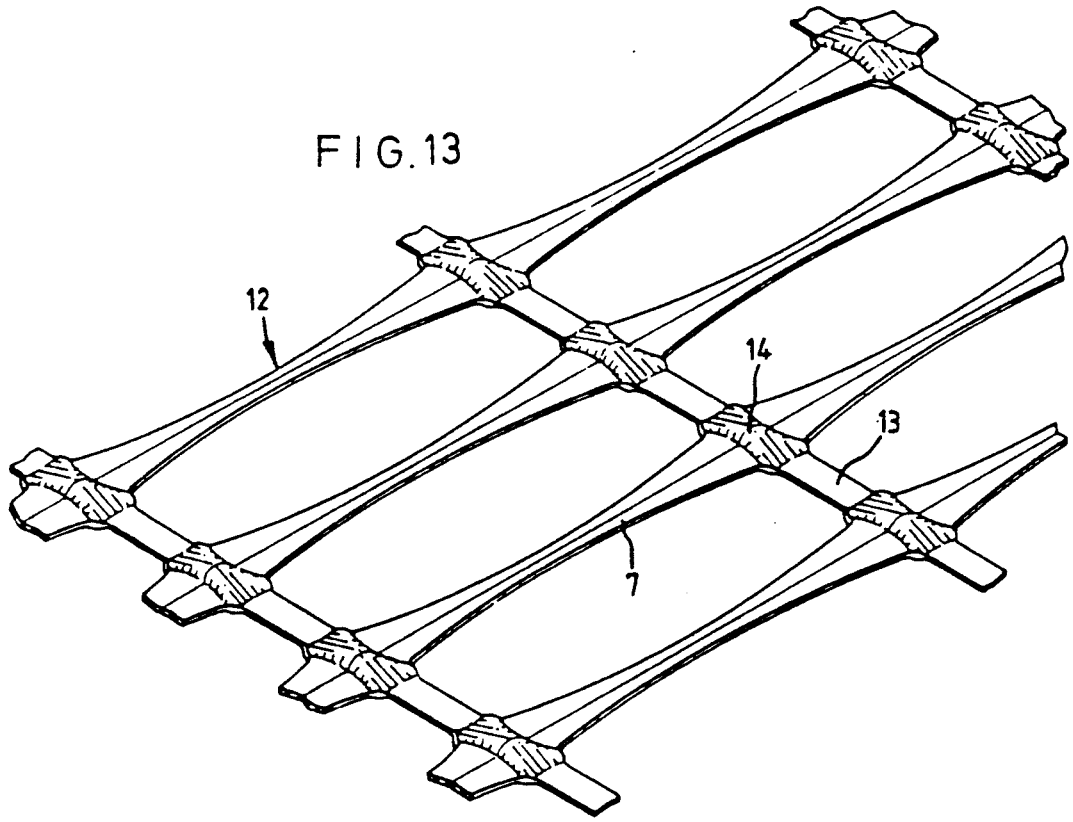

The starting material 1 was stretched longitudinally to an overall stretch ratio of 6:1 (about 11:1 on the strands), producing the uniax geogrid 5 of FIG. 10. The biax geogrid 12 of FIG. 13 was produced by stretching the structure 5 transversely 1.42:1 overall

FIGS. 15 TO 19

Figure 15:
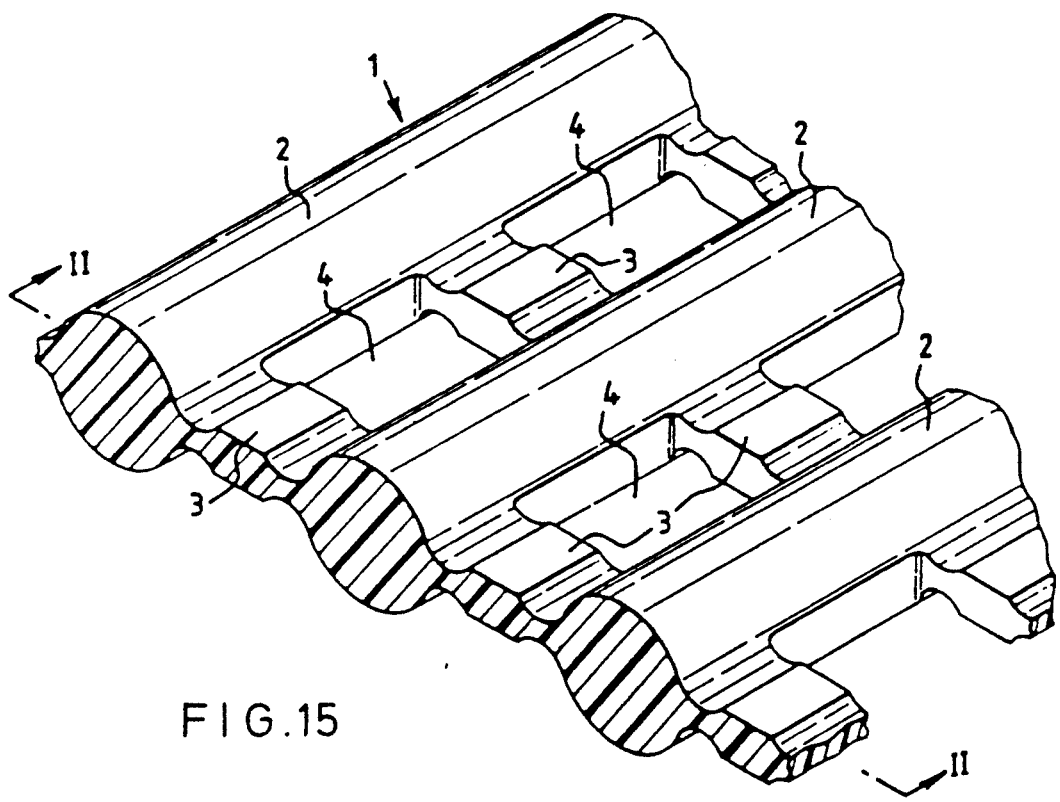
Figure 16:
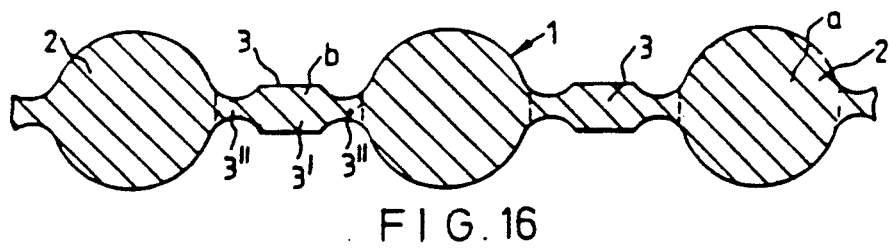

The starting material 1 shown in FIGS. 15 and 16 has longitudinal elements 2 whose cross section is generally circular, thereby providing thicker, central, longitudinally-extending portions; the circular profile is radiussed into the interconnecting elements 3. The section of the interconnecting element 3 provides a central mass 3' in the form of a thicker portion for providing anchorage or abutment when the geogrid is in the ground; on either side of the thicker portion 3', there are thinner portions 3" which act as hinges to prevent splitting forces being applied to the longitudinal strands 7. In the starting material 1, the ratio of the thickness of the longitudinal elements 2 (measured at the thickest point in the cross-section shown) to the thickness of the hinge portions 3" (measured at the thinnest points in the sections shown) is preferably less than about 10:1 and preferably more than about 5:1, preferably about 6:1—FIG. 16 shows a ratio of 6.35:1.

The tangent line runs where the circular profile of the longitudinal element 2 just begins to be radiussed into the hinge portion 3". The holes 4 are rectangular with radiussed corners, and may for instance be 12.7 mm wide.

The starting material 1 was stretched longitudinally to an overall stretch ratio of 5.5:1, producing the uniax geogrid 5 of FIG. 17.

FIGS. 20 TO 22

In FIG. 20, the longitudinal elements 2 have flat tops, which assist heating the starting material 1 prior to stretching, when using flat pre-heat cylinders. Stretching was as for FIG. 3.

FIGS. 23 TO 32

FIGS. 23 to 32 indicate various shapes that are possible for the starting material 1, apart from those already referred to above. The holes are diabolo-shaped holes as in FIG. 1, except for FIG. 26 where they are circular.

Figure 23:
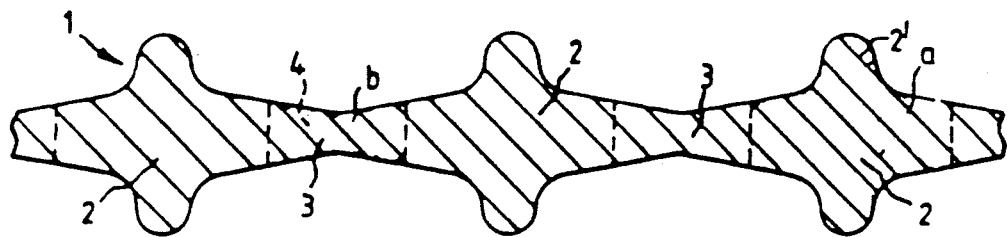

The starting material 1 of FIG. 23 is very similar to that of FIGS. 1 and 2, but has a slightly larger lobe.

Figure 24:
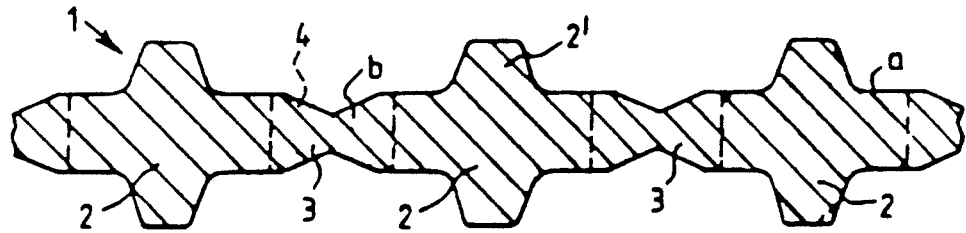

The starting material of FIG. 24 is generally similar to that of FIG. 23, but the rib 2' is somewhat larger and flat-topped, and the interconnecting elements 3 are more waisted, to provide good yield points for transverse stretching.

Figure 25:
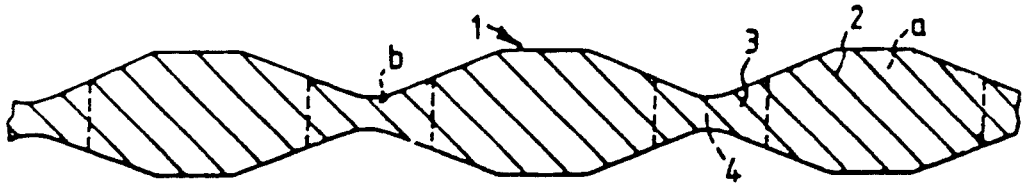

FIG. 25 can be compared with FIG. 9 (without grooving) and would give better yield points for subsequent transverse orientation to produce a biax geogrid.

Figure 26:
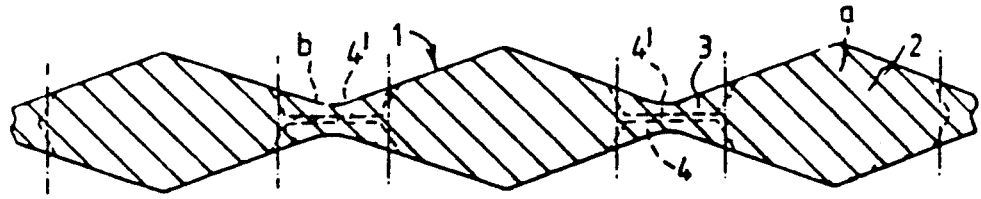

FIG. 26 shows a longitudinal element 2 whose sides have a slope of 21°, the cross-sectional shape being generally similar to that of FIG. 25 but without the flat tops. The interconnecting elements 3 continue the slope of the longitudinal elements 2. The holes 4 are blind, having been formed by embossing, and have inclined sides, leaving a base 4' on the median plane Thus the holes 4 are not vertical-sided, and the tangent line is as shown at the respective equivalent vertical-sided holes; the width of the equivalent vertical-sided holes is slightly narrower than where the holes 4 shown intersect the top and bottom faces.

Figure 27:
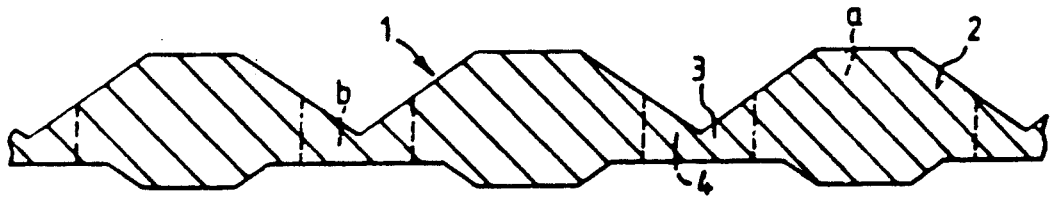

FIG. 27 shows interconnecting elements 3 off the median plane.

Figure 28:
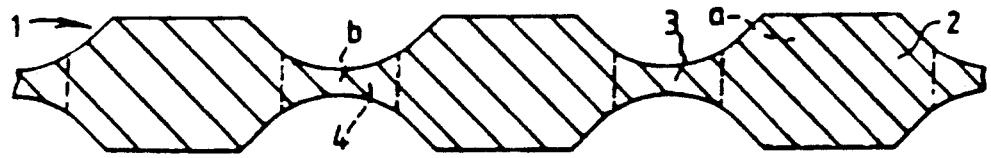

FIG. 28 shows the interconnecting elements 3 and the sides of the longitudinal elements 2 defined by curved channels This provides a defined yield point at the centre of the interconnecting element 3, for stretching transversely to form biax geogrids. The cross-section of the longitudinal element 2 is generally polygonal (octagonal) with two sides parallel to the plane of the material 1.

FIG. 29 shows a starting material 1 somewhat similar to that of FIG. 28, but with the interconnecting elements 3 against one face of the starting material 1. In general, the interconnecting elements 3 could be further displaced from the median plane.

FIG. 30 shows a starting material whose pre-starting material (before punching) was exactly as shown in FIG. 16. However, the holes 4 are narrower, causing the tangent line to run nearly through the thinnest point of the hinge portion 3".

FIG. 31 shows a starting material 1 very similar to that of FIG. 16, but the longitudinal elements 2 have flat tops and bottoms. The ratio of the thickness of the longitudinal elements 2 to the thinnest point of the hinge portion 3' is 5.7:1.

FIG. 32 illustrates the use of grooving in order to provide well defined yield points for transversely stretching structures to form biax structures. The longitudinal elements 2 can also be grooved if desired, preferably at the widest points of the holes 4. Grooving can be performed in polypropylene. It is not necessarily beneficial for all plastics materials.

TABLE 1

| Figure | Area ratio a:b | Mean thickness ratio a:b | Width: thickness ratio of a | Centre: edge thickness ratio of a |
|---|---|---|---|---|
| 1 or 2 | 3.57:1 | 2.1:1 | 1.22:1 | 3.25:1 |
| 8 or 9 (Samples 1 to 4) | 2.68:1 | 1.67:1 | 1.68:1 | 1.88:1 |
| 8 or 9 (Sample 5) | 2.72:1 | 1.5:1 | 1.72:1 | 1.93:1 |
| 15 or 16 | 3.2:1 | 3.2:1 | 1.0:1 | 4.6:1 |
| 20 | 7.54:1 | 3.76:1 | 1.70:1 | 5.0:1 |
| 23 | 3.58:1 | 2.15:1 | 1.13:1 | 3.1:1 |
| 24 | 3.18:1 | 1.91:1 | 1.06:1 | 2.5:1 |
| 25 | 4.95:1 | 2.97:1 | 1.72::1 | 1.67:1 |
| 26 | 4.28:1 | 2.67:1 | 2.52:1 | 2.33:1 |
| 27 | 4.6:1 | 2.3:1 | 1.65:1 | 2.0:1 |
| 28 | 4.05:1 | 2.43:1 | 1.72:1 | 2.3:1 |
| 29 | 7.54:1 | 3.88:1 | 1.68:1 | 3.33:1 |
| 30 | 4.0:1 | 2.4:1 | 1.25:1 | 6.35:1 |
| 31 | 3.0:1 | 3.0:1 | 1.17:1 | 4.20:1 |

TABLE 2 TERMS

All the samples were laboratory samples, except No. 10, which was a production sample. The starting material of each Sample was formed of HDPE. There was full restraint for Samples 1, 2, 4 and 5. The hole sizes are as follows:

diabolo—length 15.9 mm, maximum width 9.5 mm, centre width 9.0 mm;

hexagon—as in FIG. 33, bottom row, third from left, length 15.9 mm, width 9.5 mm.

rectangle—length 15.875 mm, width 9.525 mm.

For each sample, the strand mid-point thickness was its minimum thickness. A dash indicates that the parameter was not available.

TABLE 2

| Sample No | 1 | 2 | 3 | 4 | 5 | 6 | 7 | 8 | 9 | 10 |
|---|---|---|---|---|---|---|---|---|---|---|
| Figure | FIG. 8 | FIG. 8 | FIG. 8 | FIG. 8 | FIG. 8 | FIG. 23 | FIG. 24 | FIG. 28 | FIG. 16 | Flat |
| Maximum thickness (mm) | 9.4 | 9.4 | 9.4 | 9.4 | 9.2 | 14.0 | 15.0 | 9.2 | 12.7 | 6.0 |
| Mean thickness zone a (mm) | 7.2 | 7.2 | 7.2 | 7.2 | 6.48 | 8.06 | 9.20 | 8.5 | 10.0 | 6.0 |
| Mean thickness zone b (mm) | 4.4 | 4.4 | 4.4 | 4.4 | 4.27 | 3.75 | 4.80 | 3.49 | 3.1 | 6.0 |
| Area of zone a (mm²) | 114.3 | 114.3 | 114.3 | 114.3 | 110.7 | 128.02 | 146.11 | 135.12 | 126.6 | 95.25 |
| Area of zone b (mm²) | 42.6 | 42.6 | 42.6 | 42.6 | 40.7 | 35.71 | 45.91 | 33.3 | 39.6 | 57.15 |
| Equivalent thickness (mm) | 6.0 | 6.0 | 6.0 | 6.0 | 5.8 | 6.45 | 7.5 | 6.6 | 6.5 | 6.0 |
| Weight unpunched kg/m² | 5.68 | 5.68 | 5.68 | 5.68 | 5.5 | 6.11 | 7.1 | 6.25 | 6.15 | 5.68 |
| Hole shape | Diabolo | Diabolo | Diabolo | Diabolo | Diabolo | Diabolo | Hexagon | Diabolo | Rectangle | Diabolo |
| Weight after punching kg/m² | 5.0 | 5.0 | 5.0 | 5.0 | 4.84 | 5.5 | 6.43 | 5.68 | 5.43 | 4.71 |
| Punchout % w/w | 12 | 12 | 12 | 10.9 | 12.0 | 10.0 | 9.4 | 9.0 | 11.7 | 17.1 |
| Transverse punchout (%) | 38 | 38 | 38 | 38 | 38 | 38 | 38 | 38 | 50.0 | 38 |
| Bar length (mm) | 15.9 | 15.9 | 15.9 | 19.1 | 15.9 | 15.9 | 15.9 | 15.9 | 15.9 | 15.9 |
| Overall stretch ratio | 5.5:1 | 6.0:1 | 6.0:1 | 5.5:1 | 6.0:1 | 6.0:1 | 5.5:1 | 6.0:1 | 5.5:1 | 4.7:1 |
| Geogrid junction centre | 8.0 | 7.4 | 8.34 | 8.5 | 8.1 | 9.1 | 10.24 | 7.79 | 7.94 | 5.65 |

TABLE 2-continued

| Sample No | 1 | 2 | 3 | 4 | 5 | 6 | 7 | 8 | 9 | 10 |
|---|---|---|---|---|---|---|---|---|---|---|
| thickness (mm) | | | | | | | | | | |
| Reduction of junction centre thickness (%) | 15.0 | 21.3 | 11.3 | 9.6 | 12.0 | 35.0 | 31.7 | 15.3 | 37.5 | 5.8 |
| Geogrid weight (kg/m$^2$) | 0.9 | 0.83 | 0.83 | 0.92 | 0.86 | 1.21 | 1.39 | 1.14 | 1.16 | 1.10 |
| Strand strength (kN) | — | 3.58 | — | — | 3.45 | 3.5 | 4.2 | 3.6 | 3.55 | 2.62 |
| Geogrid strength (kN/m) | — | 147 | — | — | 141 | 192 | 201 | 176 | 171 | 110 |
| Peak strain (%) | — | — | — | — | 12.9 | 9.8 | 13.3 | 11.0 | 14.0 | 11.2 |
| Economy rating (kN/m/kg/m$^2$) | — | 177 | — | — | 164 | 159 | 145 | 154 | 147 | 100 |
| Mid-point thickness of strand on centre line (mm) | — | — | — | — | 3.0 | 5.1 | 4.95 | 3.22 | 4.74 | 2.1 |
| Minimum thickness of interconnecting element (mm) | 4.4 | 4.4 | 4.4 | 4.4 | 4.2 | 3.0 | 3.0 | 3.0 | 2.0 | 6.0 |

FIG. 33

The hole can be any suitable shape and some preferred shapes are shown in FIG. 33 Preferred shapes are square or rectangular with radiussed corners, round, elliptical, barrel, diamond with radiussed corners, hexagonal, octagonal, diabolo, diabolo with extended ends, or round-ended elongate.

FIG. 34

Figure 11:
Figure 12:

FIG. 34 shows a commercial plant for producing the starting material. A thick web 21 is extruded by an extruder 22 and passes directly, whilst still hot, between continuous circulating belts 23 at least one of which is profiled to form a profiled pre-starting material 24 without holes. The belts 23 can be in the form of a series of metal plates. After passing through initial nip rolls 25, the belts 23 and the web 21 are cooled by coolers 26. The pre-starting material 24 exits directly into a press tool 27 for punching the holes 4 in thin portions of the material 24, thereby forming the starting material 1. The starting material 1 can then be stretched in the machine direction to form a uniax grid and stretched in the transverse direction to form a biax geogrid, as shown in FIG. 11a of U.S. Pat. No. 4 374 798.

FIG. 35

FIG. 35 shows another commercial plant for producing the starting material 1. The extruder 22 extrudes the web 21 directly into a cooling callender roll stack 28 having two nips formed by three profiled rolls, each of the rolls having circumferential groove forms defining the required profile.

FIG. 36

Figure 14:
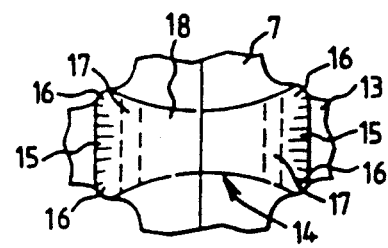

FIG. 36 shows the use of uniax geogrids 5 in accordance with the invention to reinforce an embankment 31. Many different arrangements are possible. The geogrids 5 can be connected to individual facing panels 32 by casting short geogrids 33 into the facing panels 32 and connecting the short geogrids 33 to the geogrids 5 as described in GB-A-2 078 833 (as illustrated); alternatively, other connecting means can be used; or the geogrids can be used without connection to the facing or with no facing, or could be wrapped around the facing and then taken back into the soil as in FIG. 14 of U.S. Pat. No. 4 374 798.

The present invention has been described above purely by way of example, and modifications can be made within the spirit of the invention.

The patent specifications referred to above by number are incorporated herein by reference.

We claim:

1. A method of producing a geogrid, comprising:
providing an integral plastics starting material which is substantially unoriented apart from any melt-flow orientation which may be present, which starting material has a thickness of at least 6 mm at its thickest point, and which starting material has spaced, parallel, continuous longitudinal elements and between the longitudinal elements, interconnecting elements interconnecting the longitudinal elements, there being a plurality of interconnecting elements spaced along the length of each longitudinal element, the interconnecting elements and the longitudinal elements defining holes, notional starting material junction zones being defined between notational longitudinal tangent lines extending parallel to the longitudinal elements and tangent to respective holes, and notional transverse tangent lines extending parallel to the interconnecting elements and tangent to respective holes, the notional longitudinal tangent lines defining the lateral edges of the longitudinal elements, the mean thickness of the longitudinal elements being substantially greater than the means thickness of the interconnecting elements as seen in section normal to the geogrid along the axes of the centre lines of the interconnecting elements, the area of the longitudinal elements being at least 2.5 times the area of the interconnecting elements as seen in said section; and
stretching the starting material in a direction parallel to the longitudinal elements to stretch the longitudinal elements into continuous, substantially uniaxially-oriented strands with the orientation extending substantially parallel to the axes of the strands substantially throughout the length of the strands and form a mesh structure in which mesh openings are defined by a grid comprising the interconnecting elements and the continuous oriented strands, there being a plurality of interconnecting elements spaced along the length of each continuous oriented strand, the stretching being continued until the centres of the notional junction zones have reduced in thickness by at least about 9.6%, the stretching being terminated while the centres of the notional junction zones have undergone a percentage reduction in thickness substantially less than the percentage reduction in thickness of a strand entering the respective notional junction zone, as measured midway between respective notional junction zones.

2. The method of claim 1, wherein the parts of the longitudinal elements which extend across the notional junction zones have a longitudinally-extending portion which is substantially thicker than a lateral edge of said part, as seen in said section.

3. The method of claim 2, wherein, as seen in said section, the ratio of the thickness of said longitudinally-extending portion to the thickness of a lateral edge of the longitudinal element, is at least about 1.5:1.

4. The method of claim 2, wherein said longitudinally-extending portion comprises a longitudinally-extending protuberance on at least one face of the starting material.

5. The method of claim 2, wherein, as seen in said section, substantial surfaces on either side of the thickest point of the longitudinal element slope down towards the lateral edges of the longitudinal element.

6. The method of claim 1, wherein the cross-sectional shape of a longitudinal element is approximately regular polygonal or approximately circular.

7. The method of claim 1, wherein the respective interconnecting elements define a thin portion close to the lateral edge of the longitudinal element.

8. The method of claim 7, wherein the ratio of the thickest point of the longitudinal element to the thinnest point of said thin portion is at least about 5:1, as seen in said section.

9. The method of claim 1, wherein, as seen in said section the interconnecting elements have a mid-portion which is substantially thicker than portions on either side thereof.

10. The method of claim 1, wherein the median plane of the interconnecting elements is coincident with or internally of the highest point of the outermost part of the respective face of the longitudinal element.

11. The method of claim 1, wherein the ratio of the mean thickness of the longitudinal elements to the mean thickness of the interconnecting elements, as seen in section along the axes of the centre lines of the interconnecting elements, is at least about 1.5:1.

12. The method of claim 1, wherein, as seen in said section, the ratio of the width of the longitudinal element to its thickness is not greater than about 1.75:1.

13. The method of claim 1, wherein, the longitudinal elements are of substantially uniform section.

14. A geogrid made by the method of claim 1.

15. A method of strengthening soil, comprising embedding in the soil the geogrid of claim 14.

16. The method of claim 1, wherein, in the notional junction zones of the geogrid, as seen in section normal to the geogrid along the central line of the respective strand, there is a continuous increase in thickness up to the central zone of the notional junction zone, with no dip in the notional junction zone.

17. A method of producing a geogrid, comprising:
providing an integral plastics starting material which is substantially unoriented apart from any melt-flow orientation which may be present, which starting material has a thickness of at least 6 mm at its thickest point, and which starting material has spaced, parallel, continuous longitudinal elements interconnecting the longitudinal elements, interconnecting elements interconnecting the longitudinal elements, there being a plurality of interconnecting elements spaced along the length of each longitudinal element, the interconnecting elements and the longitudinal elements defining holes, notional starting material junction zones being defined between notional longitudinal tangent lines extending parallel to the longitudinal elements and tangent to respective holes, and notional transverse tangent lines extending parallel to the interconnecting elements and tangent to respective holes, the notional longitudinal tangent lines defining the lateral edges of the longitudinal elements, the means thickness of the longitudinal elements being substantially greater than the mean thickness of the interconnecting elements as seen in section normal to the geogrid along the axes of the centre lines of the interconnecting elements, the area of the longitudinal elements being at least 2.5 times the area of the interconnecting elements as seen in said section; and stretching the starting material in a direction parallel to the longitudinal elements and in a parallel to the interconnecting elements to stretch the longitudinal elements into continuous, substantially uniaxially-oriented strands with the orientation extending substantially parallel to the axes of the strands substantially throughout the length of the strands and to stretch the interconnecting elements into interconnecting oriented strands and form a biaxially-oriented mesh structure in which mesh openings are defined by a grid comprising the continuous oriented strands and the interconnecting strands, there being a plurality of interconnecting strands spaced along the length of each continuous oriented strand, the stretching in said direction parallel to the longitudinal elements being continued until the centres of the notional junction zones have reduced in thickness by at least about 9.6%, the stretching being terminated while the centres of the notional junction zones have undergone a percentage reduction in thickness substantially less than the percentage reduction in thickness of a continuous strand entering the respective notional junction zone, as measured midway between respective notional junction zones.

18. The method of claim 17, wherein the starting material is stretched sequentially, being stretched first in said direction parallel to the longitudinal elements.

19. The method of claim 17, wherein the starting material is stretched sequentially, being stretched first in the direction parallel to the interconnecting elements.

20. The method of claim 17, wherein the parts of the longitudinal elements which extend across the notional junction zones have a longitudinally-extending portion which is substantially thicker than a lateral edge of said part, as seen in said section.

21. The method of claim 17, wherein said longitudinally-extending portion comprises a longitudinally-extending protuberance on at least one face of the starting material.

22. The method of claim 17, wherein, as seen in said section, substantial surfaces on either side of the thickest point of the longitudinal element slope down towards the lateral edges of the longitudinal element.

23. The method of claim 17, wherein the respective interconnecting elements define a thin portion close to the lateral edge of the longitudinal element.

24. The method of claim 17, wherein, as seen in said section, the interconnecting elements have a mid-portion which is substantially thicker than portions on either side thereof.

25. The method of claim 17, wherein the longitudinal elements are of substantially uniform section.

26. The method of claim 17, wherein, in the notional junction zones of the geogrid, as seen in section normal to the geogrid along the central line of the respective strand, there is a continuous increase in thickness up to the central zone of the notional junction zone, with no dip in the notional junction zone.

27. A geogrid made by the method of claim 17.

28. A method of strengthening soil, comprising embedding in the soil the geogrid of claim 17.

* * * * *